(12) United States Patent
Fernandez Duran

(10) Patent No.: US 7,206,278 B2
(45) Date of Patent: Apr. 17, 2007

(54) METHOD AND SYSTEM FOR INCREASING THE TOTAL AMOUNT OF USEFUL INFORMATION (THROUGHPUT) TRANSMITTED IN A RADIOCOMMUNICATION SYSTEM

(75) Inventor: Alfonso Fernandez Duran, Madrid (ES)

(73) Assignee: Alcatel, Paris (FR)

( * ) Notice: Subject to any disclaimer, the term of this patent is extended or adjusted under 35 U.S.C. 154(b) by 1046 days.

(21) Appl. No.: 09/953,288

(22) Filed: Sep. 17, 2001

(65) Prior Publication Data

US 2002/0034175 A1   Mar. 21, 2002

(30) Foreign Application Priority Data

Sep. 21, 2000   (ES) ................................ 200002286

(51) Int. Cl.
*H04J 11/00*   (2006.01)
(52) U.S. Cl. .................. 370/208; 370/210; 375/260
(58) Field of Classification Search ..................... None
See application file for complete search history.

(56) References Cited

U.S. PATENT DOCUMENTS 6,501,810 B1 * 12/2002 Karim et al. ............... 375/369
6,631,143 B1 * 10/2003 Karim ......................... 370/514
6,888,789 B1 *  5/2005 Sakoda et al. .............. 370/208

* cited by examiner

*Primary Examiner*—Bob A. Phunkuh
(74) *Attorney, Agent, or Firm*—Sughrue Mion, PLLC

(57) ABSTRACT

A method, system, and device are provided for increasing the total amount of useful information transmitted in a radio communication system. The method includes receiving a selection signal with which a cluster is selected; receiving data streams of information from at least two subscribers so that the streams have identical characteristics; dividing the data streams into a plurality of bit streams in order to form bit groupings through the selection of at least one bit from each one of said bit streams, for the purpose of carrying out the allocation of a state to each one of the groupings formed. Each state is associated with the cluster selected. Thereafter, the components that define the states are transmitted using orthogonal frequency division multiplexing (OFDM).

8 Claims, 2 Drawing Sheets

METHOD AND SYSTEM FOR INCREASING THE TOTAL AMOUNT OF USEFUL INFORMATION (THROUGHPUT) TRANSMITTED IN A RADIOCOMMUNICATION SYSTEM

OBJECT OF THE INVENTION

The present invention refers to a radiocommunication system and, more particularly, to a method and system for optimising and using more efficiently the available bandwidth in said radiocommunication system.

The radiocommunication system transmits, in both directions of transmission, all types of information independently of its nature (voice, data, images, video or any other), by orthogonal frequency division multiplexing (OFDM).

STATE OF THE ART

At the present time, there is an increasing number of items of equipment being located in the subscriber premises. As a consequence, the volume of information-bearing data, independently of its nature (voice, data, images, video or any other) that is being handled by the subscribers is rising.

To respond to this increase in information-bearing data to be transported to and from the subscriber premises, the radiocommunication system that is connected between the subscriber equipment and a transport network such as a switched public telephone network (PSTN), Internet network or another similar, use code division multiple access (CDMA) combined with quadrature amplitude modulation (QAM).

The aforementioned is known from the U.S. Pat. No. 5,923,651 granted to Struhsaker, being included in the present application by reference, which describes a method for increasing the total amount of useful information data communicated over the radiocommunication system during a specified or determined period of time.

The method carries out a series-to-parallel conversion (mapping) of a bit sequence received from a subscriber into its in-phase I and quadrature Q components. Both signals I, Q are associated with a modulation technique.

Next, before both signals are applied to the radio frequency RF part to be transmitted to the network side, each of said signals is encoded with a multiple access code associated with the subscriber, for the purpose of distinguishing the traffic produced by said subscriber from the traffic produced by other subscriber(s).

Clearly, the RF part includes a receiving section and a transmitting section that are connected alternately to an antenna with the object of receiving and transmitting, respectively, radio signals via said antenna.

The increase in the amount of information transmitted on a bank of frequencies employed by the radiocommunication system is achieved by using the code division multiple access (CDMA) technique.

Notwithstanding, it has some disadvantages arising from the use of the CDMA technique, such as increased complexity of the remote unit and the fixed unit, which has a negative impact on the price of these units.

CHARACTERISATION OF THE INVENTION

An object of the present invention is to increase the total amount of useful information (throughput) transmitted on at least one frequency employed by a radiocommunication system during a specified or determined period of time, showing an optimised use of the bandwidth of the radiocommunication system since the available or allocated bandwidth tends to be occupied.

The invention provides a method that increases the total amount of useful information (throughput) transmitted in a radiocommunication system which facilitates connections between subscribers and a telephone transport network using orthogonal frequency division multiplexing (OFDM).

According to the invention a transmitter device receives an information data stream from a subscriber. Said stream is divided into at least two bit streams that are applied to a first converter which carries out a grouping of bits, in such a manner that to each grouping formed, a state of a cluster is allocated to it. The cluster is selected according to a selection signal received in the first converter.

The components that define each state are transmitted according to a multilevel modulation.

BRIEF DESCRIPTION OF THE DRAWINGS

A more detailed explanation of the invention is provided in the following description, based on the figures attached, in which.

DESCRIPTION OF THE INVENTION

Figure 1:
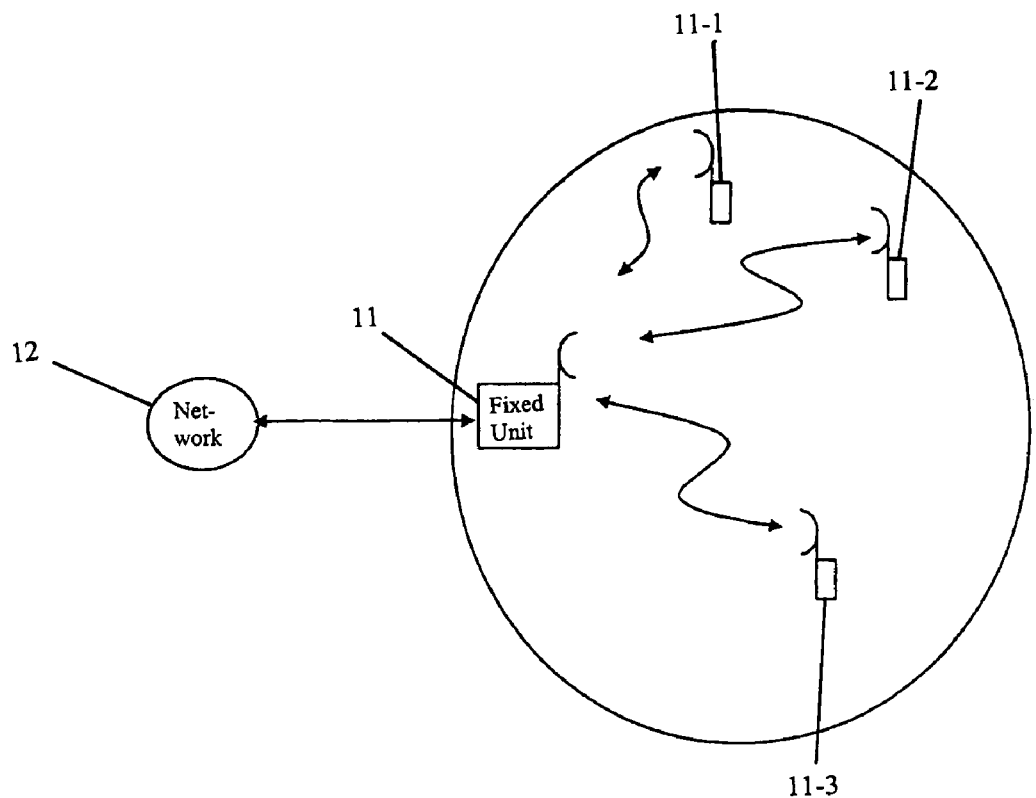
FIG. 1 shows, in schematic form, a radiocommunication system according to the invention.

FIG. 1 shows a radiocommunication system that comprises a plurality of fixed units, of which only unit 11 is shown, which has an interface whereby it is capable of setting up communication with at least one telephone transport network 12, such as a switched public telephone network (PSTN), Internet network or another similar.

The radiocommunication system also comprises a set of remote units, of which units 11-1, 11-2 and 11-3 are shown, which are capable of setting up radio links with the fixed unit 11 employing radio techniques, such as orthogonal frequency division multiplexing (OFDM). Consequently, each one of the remote units and fixed units has a radio transmitter-receiver, respectively.

The information traffic intended for and/or produced by a subscriber is channelled through a remote unit 11-1 and the fixed unit 11 towards the telephone transport network 12.

Thus, the information data stream associated with said subscriber is transmitted independently of its nature (voice, data, images, video or any other), in accordance with a communications protocol, such as the TCP/IP protocol, to the telephone transport network 12.

Figure 2:
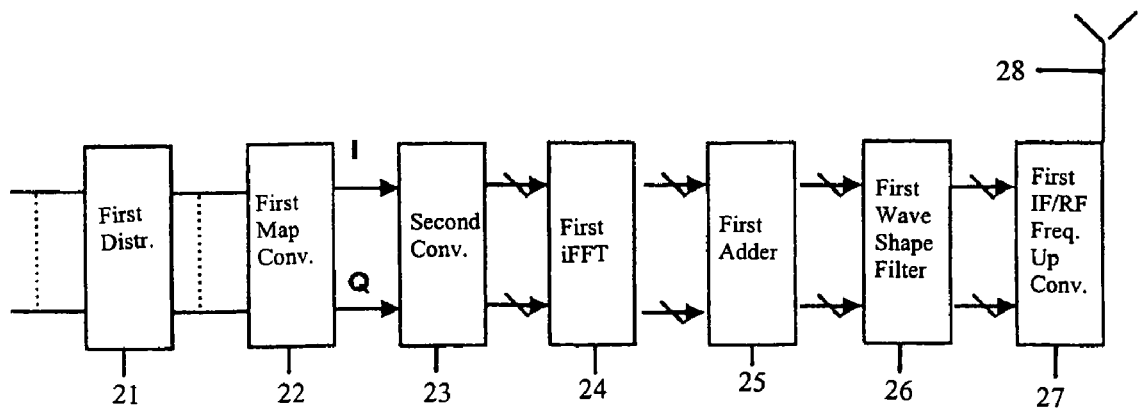
FIG. 2 shows a block diagram of a transmitter according to the invention.

As is shown in FIG. 2, the information data stream is received in a first distributor 21 which carries out a received data stream division. Said first distributor 21 divides said information data stream into at least two data bit streams (bit sequences).

In the event that said distributor receives more than one information data stream, said streams have to be identical, that is, have the same characteristics.

Each bit sequence is applied to a first mapping converter 22 through an output of the first distributor 21, respectively. As a consequence, each output is associated with an input of the first mapping converter 22, respectively.

The first mapping converter 22 has a number of outputs that is equal to or less than its corresponding number of inputs.

The first mapping converter 22 carries out a grouping of bits received through each of the inputs. To do this, for example, it takes one bit from each of the inputs and to each grouping so formed it allocates thereto a state corresponding to a cluster relative to a modulation.

Each state of the cluster can be represented on some Cartesian coordinates (ordinate axis and abscissa axis); therefore, to each state there corresponds an in-phase component I and a quadrature component Q. Each one of the components is associated with an output of the first mapping converter 22, respectively.

Both output signals I, Q of the first mapping converter 22 are applied to a transmitting section which carries out the transmission of said signals I, Q on a radio frequency via a first antenna 28.

The transmitter is analogous both for the fixed unit 11 and the remote unit 11-1. The transmitter comprises a second converter 23, a first inverse fast Fourier transform module 24, a first adder 25, a first wave-shaping filter 26, a first IF/RF frequency up-converter 27 and the first antenna 28.

The transmitter is analogous to that described under item 17.3.8.1. of the IEEE P802.11/D3.0, the operation of which shall not be described, given that it is known in the state of the art and is incorporated in the present application by reference.

The first mapping converter 22 and the transmitter are capable of operating on a broad set of clusters, in such a manner that each cluster is associated with the number of bits that constitute each grouping. The minimum number of bits that can constitute a grouping is two.

The number of states of a cluster is related with the number of inputs that the first mapping converter 22 has, so the number of states is equal to $2^n$, where n is the number of inputs of the first mapping converter 22.

The output rate of the first mapping converter 22, namely symbol rate, is variable and depends on the number of states which the cluster has. Thus, for a determined symbol rate, the data bit rate can be increased or diminished. A cluster that has a greater number of states provides an enhancement of the transmission capacity (throughput) for a given bandwidth.

Consequently, with a control signal it is possible to select the operating speed of the first mapping converter 22, that is, the cluster on which it works is selected, and as a result it is possible to vary the throughput of the radiocommunication system.

Figure 3:
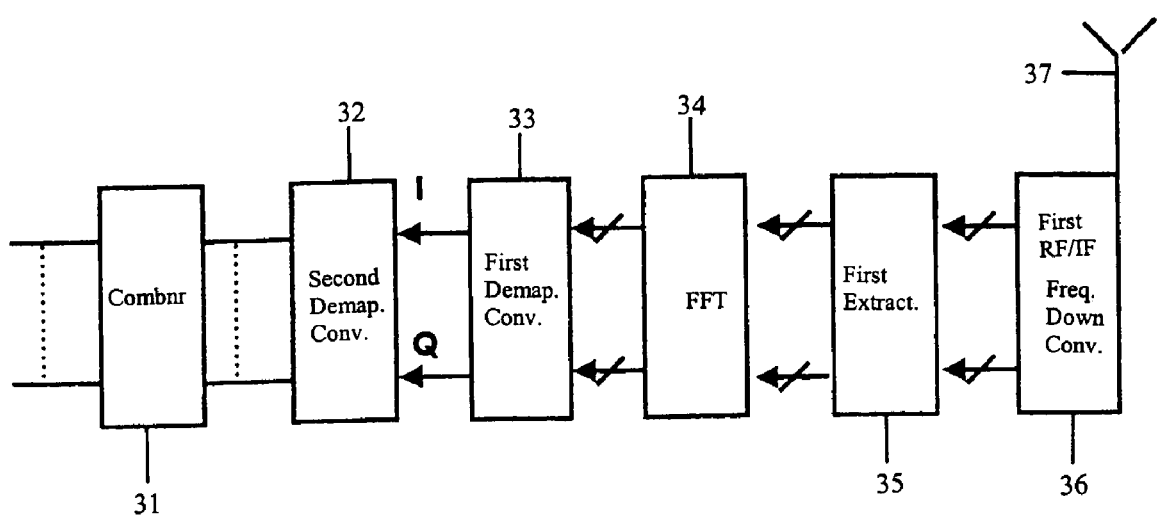
FIG. 3 shows a block diagram of a receiver according to the invention.

FIG. 3 shows a receiving section of the fixed unit 11 that receives the radio signal transmitted from the remote unit 11-1 via a second antenna 37. This receiver is analogous both for the fixed unit 11 and for the remote unit 11-1.

The receiver comprises the second antenna 37, a first RF/JF frequency down-converter 36, a first extractor 35, a fast Fourier transform module 34, a first demapping converter 33 that produces at its output the signals I, Q produced at the outputs of the first mapping converter 22, which are applied to a second demapping converter 32 and a combiner 31, obtaining at its outputs the information stream produced by the subscriber that shall be transported by the telephone transport network to its final destination.

The receiver also is analogous to that described under item 17.3.8.1. of the IEEE P802.11/D3.0 and whose operation shall not be described, given that it is known in the state of the art.

The invention claimed is:

1. A method for increasing a total amount of useful information transmitted in a radiocommunication system comprising at least one fixed unit that sets up radio links with at least one remote unit using orthogonal frequency division multiplexing (OFDM), the method comprising:
   receiving at least one information data stream;
   dividing said information data stream into at least two bit streams,
   grouping formation by means of the selection of at least one bit from each one of said bit streams in order to thereby form a group;
   allocating a state to the group, such that to the state there corresponds an in-phase component and a quadrature component;
   associating the state allocated to the group, to a determined cluster of modulation; and
   selecting a cluster that has a greater number of states corresponding thereto, thereby providing an enhancement of transmission capacity for a given bandwidth.

2. The method as in claim 1, wherein the at least one information data stream is received by a distributor.

3. The method as in claim 1, wherein the information data stream is divided by a distributor.

4. The method as in claim 1, wherein the formation is grouped by a first mapping converter.

5. The method as in claim 1, wherein each one of the components is associated with an output of a first mapping converter for input inot a transmitter.

6. The method of claim 1, wherein the a cluster is selected by means of a control signal applied to a first mapping converter.

7. A system for increasing a total amount of useful information in a radiocommunication system comprising at least one fixed unit adapted to set up radio links with at least one remote unit using orthogonal frequency division multiplexing, the system comprising:
   a first distributor that receives at least one information data stream from at least one subscriber and produces a bit stream at each of its outputs; and
   a first mapping converter which:
      receives the bit streams;
      groups formation by means of the selection of at least one bit from each one of said bit streams in order to thereby form a group;
      allocates a state to the group, such that to the state there corresponds an in-phase component and a quadrature component, each one of said components being associated with an output of the first mapping converter for input to the transmitter;
      associates the state allocated to the group, to a determined cluster of modulation; and
      selects, by means of a control signal applied to the first mapping converter, a cluster that has a greater number of states corresponding thereto, thereby providing an enhancement of transmission capacity for a given bandwidth.

8. A device for increasing a total amount of useful information in a radiocommunication system, the device comprising:
   a first distributor that receives at least one information data stream from at least one subscriber and produces a bit stream at each one of its outputs; and
   a first mapping converter which:
      receives the bit streams;

groups formation by means of the selection of at least one bit from each one of said bit streams in order to thereby form a group;

allocates a state to the group, such that to the state there corresponds an in-phase component and a quadrature component, each one of said components being associated with an output of the first mapping converter for input to the transmitter;

associtates the state allocated to the group, to a determined cluster of modulation; and selects, by means of a control signal applied to the first mapping converter, a cluster that has a greater number of states corresponding thereto, thereby providing an enhancement of transmission capacity for a given bandwidth.

* * * * *